June 11, 1929. J. O. CARREY 1,716,484
FLEXIBLE MOTOR MOUNTING
Filed Sept. 18, 1924 2 Sheets-Sheet 1
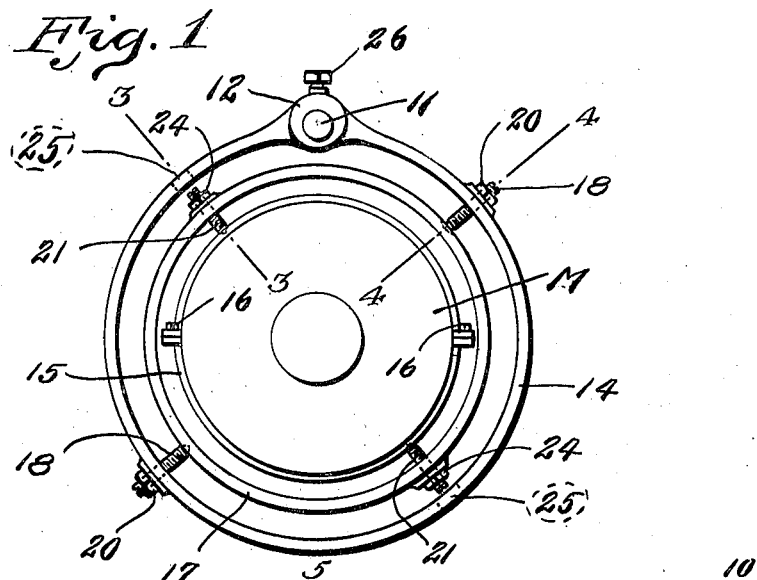
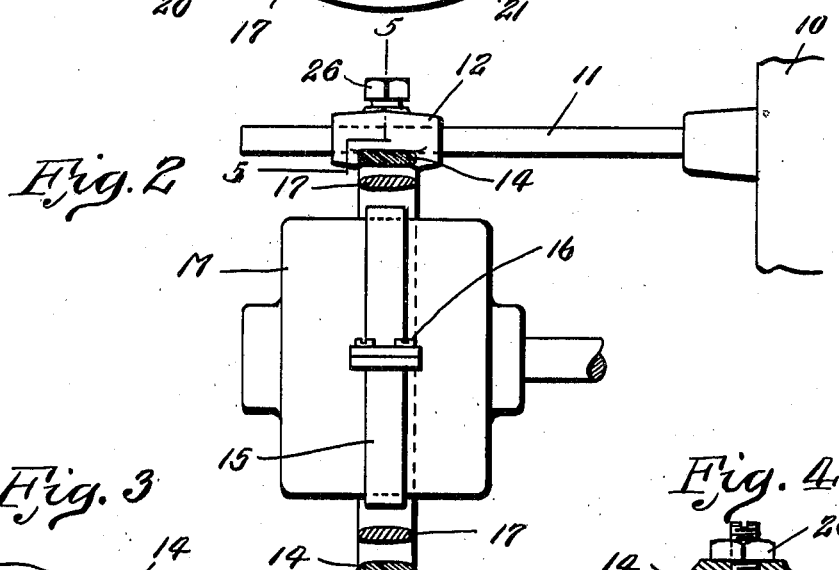
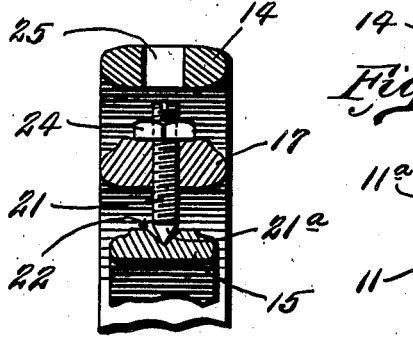
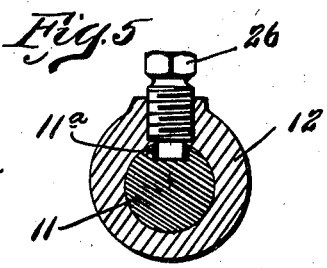
Inventor
John O. Carrey
By Cornwall, Bidell & Janus
Attys.

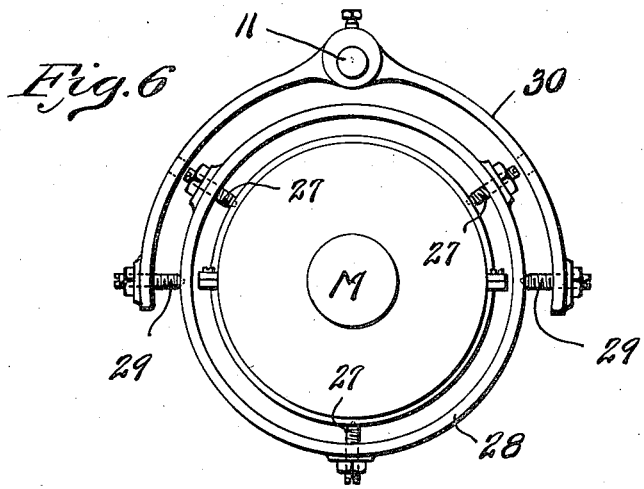
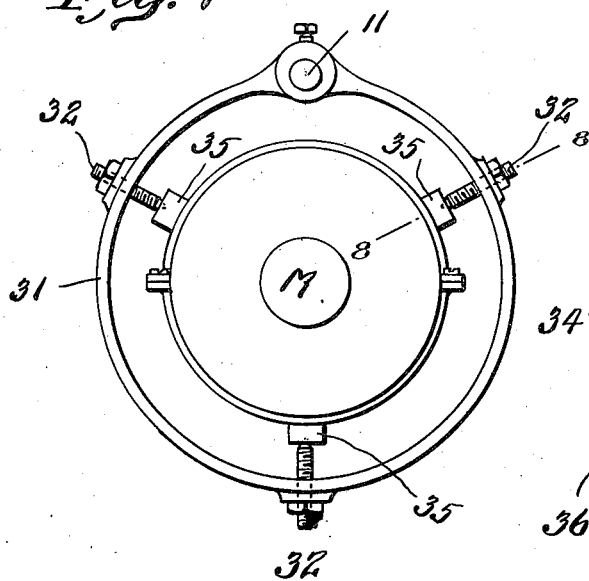
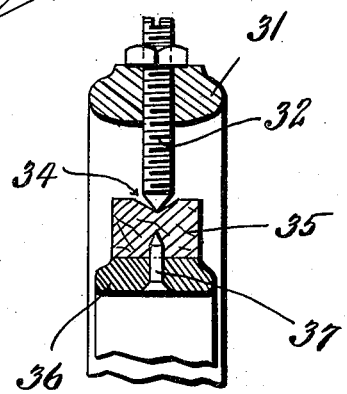

Patented June 11, 1929.

1,716,484

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

FLEXIBLE MOTOR MOUNTING.

Application filed September 18, 1924. Serial No. 738,524.

This invention relates to new and useful improvements in motor mountings and the objects of the invention are to provide a simple device for mounting electric motors and other apparatus, which device is flexible so as to permit the motor to adjust itself relative to the mechanism to be driven thereby and which device is arranged so as to reduce to minimum vibration and noises produced by the operation of the apparatus.

Further objects of the invention are to provide a motor mounting having a single point of support and having a plurality of points for engaging and supporting the motor, the last mentioned points being adjustable relative to the axis of said motor so as to correctly locate the same in coaxial relation with the parts to be driven.

Still further objects of the invention are to provide a mounting which can be easily placed in position, can be manufactured at low cost, has its motor engaging parts adjustable so as to properly locate the motor, and which device is flexible so as to permit automatic adjustment of the motor.

With these and other objects in view, my invention consists in certain novel features of construction and arrangement of parts, hereinafter more fully described and claimed, and illustrated in the accompanying drawings, in which—

Figure 1 is an end elevational view of the mounting with the motor supported thereby.

Figure 2 is a side elevational view of the mounting.

Figure 3 is an enlarged cross sectional view taken on line 3—3 of Figure 1.

Figure 4 is an enlarged cross sectional view taken on line 4—4 of Figure 1.

Figure 5 is an enlarged vertical cross section taken on line 5—5 of Figure 2.

Figure 6 is a modified form of mounting, showing a three-point support for the motor.

Figure 7 is a further modified form wherein only one supporting ring is used and the pins thereof engage blocks of suitable elastic material, which latter are carried by the clamp ring.

Figure 8 is an enlarged cross section taken on line 8—8 of Figure 7.

Referring by numerals to the accompanying drawings, 10 indicates a stationary member which preferably forms a part of the apparatus to be driven. Extending from said member is a horizontally disposed rod 11 on which is slidably arranged a sleeve or tubular portion 12 which is formed integral with a ring 14. This ring 14 is of suitable diameter so as to provide proper clearance between it and motor M which is disposed within said ring. Engaging the body portion of said motor is a clamp ring 15 which is formed in two halves, the ends of which are secured together by suitable fastening devices, such as screws 16. Thus by loosening said ring halves, motor M can be shifted therein, thereby permitting axial adjustment of said motor in the mounting.

An intermediate ring 17 is disposed between outer ring 14 and clamp ring 15 in spaced relation therewith. Intermediate ring 17 is supported in position by bolts or pins 18 which are screw-seated in the outer ring 14 and project inwardly therefrom and have their tapered ends 18ª engaging suitable seats 19 formed in the outer periphery of intermediate ring 17. Pins 18 being screw-seated in ring 14 are adjustable in radial direction so as to properly locate intermediate ring 17 and are provided with lock nuts 20 by means of which said pins can be locked in their adjusted positions. There are preferably two of these pins and they are diametrically opposed to each other, thereby forming a pivotal mounting for ring 17 so that the latter may be tilted about the axes of said pins.

Screw-seated in intermediate ring 17 are pins or screws 21 having their inner tapered ends 21ª projecting radially into engagement with seats 22 formed in the outer periphery of clamp ring 15. There are preferably two of these pins diametrically opposed to each other and preferably arranged at right angles to pins 18 as shown in Figure 1. Thus the motor to which clamp ring 15 is fixed can be tilted, the points 21ª serving as first points. Pins 21 are adjustable in radial direction and are provided with nuts 24 which serve to lock said pins in adjusted positions.

Ring 14 is provided with suitable apertures or openings 25 which are disposed in alignment with the axes of pins 21 and permit the insertion of a tool, such as a screw driver, for the purpose of engaging the heads of pins 21. Thus by adjusting pins 18 and 21 motor M properly centers the same.

The pivotal mounting of rings 15 and 17 provides for the tilting of the motor so that the shaft thereof can automatically adjust itself in coaxial alignment with the driven member. The sleeve 12 is preferably formed in the top portion of ring 14 so that the point of support of said ring is located above and in vertical plane with the center of said ring.

Rod 11 is of sufficient length to permit sleeve 12 to move longitudinally thereof in order to locate the motor a proper distance from the apparatus. Rod 11 is provided with a longitudinally disposed groove 11$^a$ which is engaged by the lower end of a set screw 26 screw-seated in sleeve 12. The interengagement of set screw 26 with the groove 11$^a$ holds the mounting against swinging movement and maintains ring 14 in proper position. When the mounting has been adjusted longitudinally of rod 11, said mounting can be locked in position by tightening screw 26.

Clamp ring 15 and intermediate ring 17 are arranged within outer ring 14 and in substantially concentric relation therewith and with each other and the diameters of their respecive rings are such as to provide proper clearance therebetween so as to provide for the proper adjustment of the rings and the motor supported thereby.

In the form just described, two supporting rings are used, the inner one of which is supported on a pair of diametrically opposed pins and in turn supports the motor by a pair of pins carried thereby.

In the modified form shown in Figure 6, the motor is supported at three points by three pins 27 carried by an inner ring 28. This ring is supported by a pair of pins 29 which are mounted in the ends of a semi-circular member 30 which is mounted on rod 11 in the usual manner The modified form disclosed in Figures 7 and 8 comprises a ring or circular member 31 suspended from rod 11 and having a plurality of pins 32, the inner ends of which are seated in seats 34 in blocks 35 formed of suitable sound and vibration cushioning material, such as wood, whereby very little vibration is transmitted to the ring, which further cushions and absorbs such vibration.

The blocks 35 are secured to the clamp ring 36 by pins 37 which are fixed to said ring and project into bores formed in said blocks. The rings are made comparatively thin so as to be elastic and absorb the vibrations produced by the operation of the motor and thus prevent the transmission of such vibrations to the support which is rigidly held in position.

A mounting of my improved construction has a wide range of adjustments and permits a certain degree of self-adjustment for the apparatus, and is comprised of a plurality of resilient members, each of which is adapted to absorb and deaden the vibration and noise produced by the operation of said apparatus, whereby the vibration reaching the stationary support is negligible, thus insuring quiet operation of the motor.

While I have shown and described the preferred forms of my improved motor mounting, it is obvious that various other changes and modifications in the arrangement and construction of the mounting can be made and substituted for those herein described, without departing from the spirit of my invention.

I claim:

1. A vibration absorbing mounting comprising in combination a fixed horizontally disposed rod member, secured at one end, an outer substantially resilient ring suspended from said member at a single point remote from said fixed end, an inner substantially resilient ring disposed within the first ring in spaced relation and in the same plane therewith, screws radially seated in said outer ring and engaging said inner ring at diametrically opposed points, and screws radially seated in said inner ring in spaced relation with said first screws and adapted to engage and support the apparatus arranged within said inner ring substantially co-axially therewith.

2. A vibration absorbing mounting comprising in combination a fixed support, an arcuate substantially resilient member suspended at a single point from said support, a substantially resilient ring arranged within said arcuate member and in the same vertical plane therewith, means seated in said member and pivotally supporting said ring at diametrically opposed points, and means seated in said ring and extending inwardly and adapted to engage pivotally the peripheral wall of the apparatus to be supported, both of said means having their axes inclined from vertical and horizontal planes.

3. A vibration absorbing mounting comprising in combination a horizontally disposed rod fixed at one end and arranged in parallel with the axis of the apparatus to be supported, an arcuate member suspended from said rod, a ring arranged within said arcuate member, and in the same plane therewith, screws adjustably arranged in said arcuate member and pivotally engaging and supporting said ring at a plurality of circumferentially spaced points, and screws adjustably arranged in said ring in spaced relation with said first screws and extending inwardly and adapted to engage seats disposed on the periphery of the apparatus to be supported, said arcuate member and said ring being comparatively wide and thin in cross section to render them resilient for absorbing vibration produced by the operation of said apparatus, said arcuate ring being provided with apertures coaxial with the screws of the ring to provide access to said screws.

4. A vibration absorbing mounting comprising in combination a fixed elongated member, an arcuate member having its crown portion provided with a tubular extension mounted on said elongated member, a metallic ring arranged in the same plane with said arcuate member, a plurality of screws seated in said arcuate member and engaging said ring at a plurality of points spaced circumferentially, said ring being comparatively wide and thin in cross section to render it resilient for absorbing vibration, and a plurality of screws seated in said ring and extending inwardly for engaging and supporting a suitable apparatus at a plurality of points spaced circumferentially thereof.

5. In a device of the class described, the combination of a fixed elongated member, an arcuate member having its crown portion formed with a tubular extension adjustably mounted on said elongated member, a metallic ring arranged in the same vertical plane with said arcuate member, a plurality of screws seated in said arcuate member and engaging said ring at a plurality of points spaced circumferentially, said screws being adjustable to adjust the axis of said ring, said ring being comparatively wide and thin in cross section to render it resilient for absorbing vibration, and a plurality of screws seated in said ring and extending inwardly for engaging a suitable apparatus at a plurality of points spaced circumferentially thereof, said last mentioned screws being adjustable to adjust the axis of said apparatus.

6. In a device of the class described, the combination of a fixed elongated member, an arcuate member having its crown portion formed with a tubular extension adjustably mounted on said elongated member whereby said arcuate member can be adjusted in a horizontal plane, means for locking said tubular extension in adjusted position on said elongated member, a metallic ring arranged in the same vertical plane with said arcuate member, said ring being comparatively wide and thin in cross section to render it resilient for absorbing vibration, a plurality of screws seated in said arcuate member and engaging said ring at a plurality of points spaced circumferentially, said ring being adjustable axially by means of said screws, means engageable with the apparatus to be supported and provided with a series of seats disposed circumferentially, and a plurality of screws seated in said ring and extending inwardly for engaging said seats and supporting said apparatus, said last mentioned screws being adjustable to adjust said apparatus axially.

In testimony whereof I hereunto affix my signature this 13th day of September, 1924.

JOHN O. CARREY.